United States Patent [19]

Vanderwerf

[11] Patent Number: 4,867,555

[45] Date of Patent: Sep. 19, 1989

[54] RETROFOCUS LENS FOR OVERHEAD PROJECTOR

[75] Inventor: Dennis F. Vanderwerf, Cottage Grove, Minn.

[73] Assignee: Minnesota Mining and Manufacturing Company, St. Paul, Minn.

[21] Appl. No.: 138,325

[22] Filed: Dec. 26, 1987

[51] Int. Cl.[4] ............................................. G02B 9/64
[52] U.S. Cl. ..................................... 353/98; 353/100; 353/DIG. 6
[58] Field of Search ............... 350/456, 426, 458, 462; 353/DIG. 3, DIG. 4, DIG. 6, 98, 99, 100, 101

[56] References Cited

U.S. PATENT DOCUMENTS 3,126,786  3/1964  Appledorn .
3,334,957  8/1967  Field .
4,145,117  3/1979  Ikeda .
4,182,549  1/1980  Kreitzer .
4,203,653  5/1980  Mori .
4,304,466  12/1981  Betensky ............................. 350/426

OTHER PUBLICATIONS

"L.C. Light Valve Projector for Shipboard Use" Ronald S. Gold, SPIE vol. 250, 1980.

Primary Examiner—Harry N. Haroian
Attorney, Agent, or Firm—Merchant, Gould Smith, Edell Welter & Schmidt

[57] ABSTRACT

A four-element inverted telephoto projection lens assembly for use in conventional overhead projectors is disclosed. The lens assembly features a reduced projection distance from the lens assembly to the projection screen while retaining the same back focus as conventional two-element projection lenses for overhead projectors.

5 Claims, 1 Drawing Sheet

RETROFOCUS LENS FOR OVERHEAD PROJECTOR

BACKGROUND OF THE INVENTION

1. Field of the Invention

The present invention relates generally to overhead projectors and, in particular, to projection lenses used with said projectors.

2. Description of the Related Art

Overhead projectors are used to form an enlarged image of a photographic transparency or other material on a projection screen. Overhead projectors generally include a base or housing which contains a light source and associated optical elements. A vertical beam of light is directed upward from the light source and through a transparent plate, or projection stage, located at the top of the housing. With conventional overhead projectors, a Fresnel condenser lens assembly located within the housing beneath the projection stage serves to concentrate light from the light source through the transparency and to concentrate light on a projection lens disposed above the projection stage.

Conventional overhead projectors also include a projection head which carries the projection lens assembly. The projection head is carried by a bracket which is slidably positionable along a vertical post extending upwardly from the housing. The most conventional form for overhead projection lenses is a two-element projection lens assembly utilizing two spaced positive meniscus lenses, one to direct light toward a mirror reflector, and the other to receive light from the mirror to project an image on a vertical projection screen or surface to enable the magnified image of the transparency to be viewed. The projected image is focused by movement of the projection lens assembly toward and away from the stage upon which the transparency to be projected is placed. Conventional two-element projection lenses are illustrated and described in such publications as U.S. Pat. Nos. 3,126,786 issued to Appeldorn and 3,334,957 issued to Field.

Conventional projection lenses for use in overhead projectors have a focal length in the range of 275 to 355 millimeters. The focal length of the projecting lens is determined by the magnification desired and the distance of the projector from the screen. For the magnification range through which this type of projection lens is used, the projection distance between the overhead projector and the projection screen must be several feet in order to project an image which is large enough for readability. For example, using a typical 350 millimeter focal length projection lens at a 5.7× magnification, the projector is between seven (7) to eight (8) feet (2.13 to 2.44 meters) from the screen.

However, this projection distance is often incompatible with smaller conference rooms. In smaller conference rooms, the overhead projector may not allow enough space between the presenter and the audience. This distance between the projector and the screen also may result in partial blockage of the screen by the projector and/or the presenter. It is therefore desirable in certain situations to be able to position the overhead projector closer to the projection screen.

A shorter focal length, "wide-angle" projection lens is one attempt to decrease the projection distance while maintaining the same image magnification. The most useful shorter focal length lenses for this application are in the 235 to 245 millimeter range. However, the use of this type lens results in a reduced back focal distance, i.e., the distance between the transparency and the center of the bottom lens. This type of short focal length lens is therefore incompatible with the focus adjustment range of conventional overhead projectors, because the focusing post of the overhead projector must be shortened significantly, and special Fresnel condensing optics must be used. Most importantly, these type of lenses have a reduced field coverage which will not image a full-sized A4 stage, so that an outer portion of the transparency will not be projected on the projection screen.

One way to increase the lens field coverage and back focus relative to the focal length is a lens system of the retrofocus or inverted telephoto type. With this type of lens, the back focus can be considerably increased with respect to the focal length. Although there have been many designs for lens systems of this type, e.g., U.S. Pat. Nos. 4,145,117 issued to Ikeda; 4,182,549 issued to Kreitzer; and 4,203,653 issued to Mori, these lens systems have not addressed the special requirements of overhead projection. Also, these lens system designs are often complex, consisting of five or more lens elements.

The present invention addresses the problems associated with the above projection lens designs.

SUMMARY OF THE INVENTION

The present invention comprises a four-element retrofocus projection lens assembly for use with conventional overhead projectors for projecting an image from a transparency stage to a projection screen. The lens assembly consists of two groupings of two lens elements each, separated by a mirror. The projection lens assembly affords a reduced projection distance from the lens assembly to a projection screen while retaining substantially the same back focal distance as conventional longer focal length two-element projection lenses for overhead projectors. The lens assembly particularly includes, in order from the stage to the screen, a diverging meniscus lens, airspaced from a converging meniscus lens, airspaced from a converging double convex lens, airspaced from a diverging double concave lens.

The lens assembly further includes a mirror positioned between the converging meniscus lens and the converging double convex lens for folding light from a vertical direction to a horizontal direction.

The present invention is advantageous in that the overhead projector can be positioned closer to the projection screen than was possible with conventional overhead projectors. This allows for optimal positioning of the overhead projector, especially in small conference rooms. The lens system of the present invention also allows a full A4 size transparency to be projected upon the screen, with large enough magnification to provide readability of the image.

Another feature of the present invention is that the lens system is fully interchangeable with the projection lenses of a conventional overhead projector. The lens system maintains the back focal distance of conventional, longer focal length lenses. Thus, the projection lens systems can be easily interchanged, depending upon the size and configuration of the conference room and audience. To accomplish this, one need merely attach the appropriate projector head to the conventional overhead projector's support post, one projector head containing the conventional two element lens system, and another projector head containing the retrofocus lens system of the present invention.

These and other features of the invention will become apparent from a consideration of the following description of the invention and accompanying drawing which form a part of this application.

BRIEF DESCRIPTION OF THE DRAWINGS

The present invention will be more particularly described with respect to the accompanying drawing, wherein.

DESCRIPTION OF THE PREFERRED EMBODIMENT

Figure 1:
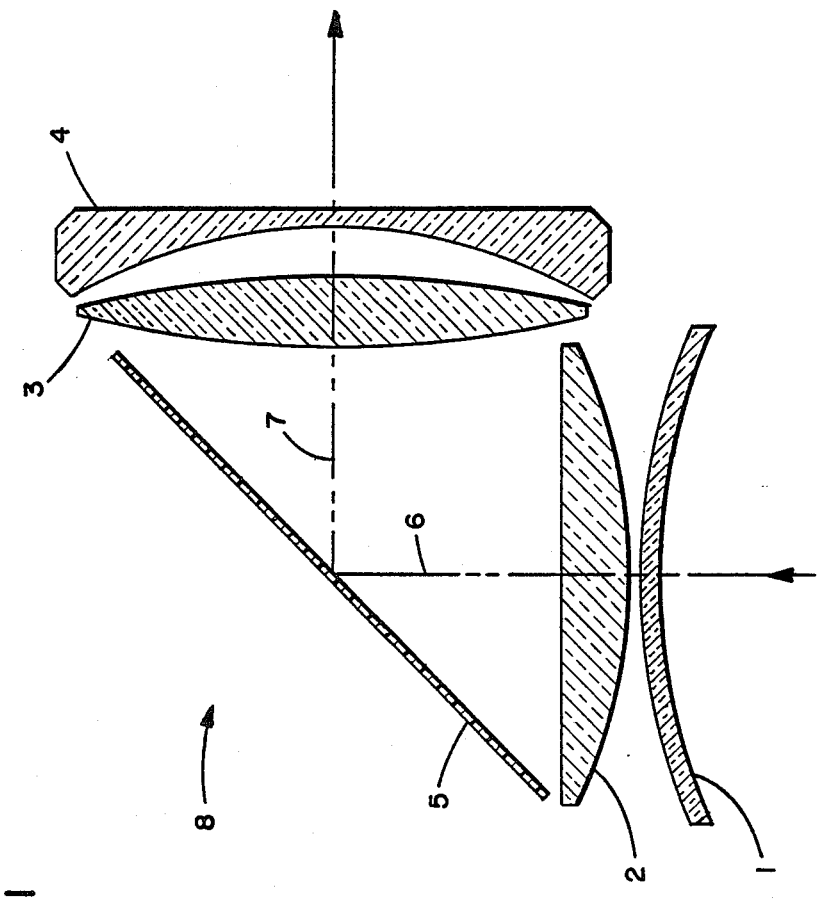
FIG. 1 is a schematic view of a projection lens assembly constructed in accordance with the present invention.

Referring 1, there is illustrated a schematic view of the projection lens assembly of the present invention, designated generally at 8, for use in an overhead projector. A vertical axial ray of light, illustrated by the line 6, extends from a light source (not shown) in the base of the overhead projector and through the projection lens assembly. A horizontal axial ray of light, illustrated by the line 7, extends from the projection lens assembly 8 to a remote projection screen (not shown). The axial rays 6,7 denote the center of the projected cone of light. The lens assembly 8 of the present invention is preferably mounted upon a support arm for movement along the vertical optical axis 6 toward and away from the stage to facilitate focusing of the image upon the screen.

The projection lens assembly 8 of the present invention is utilized with a conventional overhead projector as is well known in the art. Such an overhead projector typically has a base or housing with a clear glass stage upon which is positioned a transparency (not shown) of which a magnified image is to be projected.

The projection lens assembly 8 illustrated in FIG. 1 comprises a diverging or negative meniscus lens 1, which is airspaced from a converging or positive meniscus lens 2, airspaced from a converging or positive double convex lens 3, which is airspaced from a diverging or negative double concave lens 4. The diverging meniscus lens 1 has its concave side facing the stage; the converging meniscus lens 2 has its convex side facing the stage; and the diverging double concave lens 4 has its longer radius concave side facing the projection screen. Positioned between the converging meniscus lens 2 and the converging double-convex lens 3 is a plane mirror 5, which is oriented to fold or direct light passing through the projector stage from a vertical path 6 to a horizontal path 7 toward the projection screen.

The mirror 5 and lenses 3 and 4 are movable to afford a tilt capability to the projected image to move the image up and down on the screen in a manner well known in the art as an "articulating" arrangement, wherein the lens 3 and 4 pivot at twice the angular rate of pivotal movement of the mirror 5.

A preferred specific embodiment of the lens assembly 8 of FIG. 1 is listed below in Table 1, wherein the respective lenses are recited together with the corresponding refractive indices, $N_d$, for the spectral D line of the spectrum; the corresponding dispersive indices or Abbenumber, V, are given for each lens; and the radii of curvature, R, of each surface of each lens is given. The respective lens surfaces are numbered in sequence and indicated by a numerical subscript in the same order as the lenses are consecutively numbered from the stage toward the screen, with plus and minus value of R indicating surfaces which are convex and concave respectively to radiation entering the front surface of the lens (the surface closest to the stage). The axial thickness T of the respective lenses and the airspaces S between the lenses are also recited with the respective lens thickness T being identified for each lens by the corresponding subscript, and airspaces S between lens elements being also identified by subscripts numbered in sequence in the same order as the lenses. The quantities of the radii R, thickness T, and spacing S are expressed in millimeters.

TABLE 1

| Lens | Refractive Index $N_d$ | Abbe Number V | Radius of Curvature R (mm) | Thickness T (mm) | Airspaces S (mm) |
|---|---|---|---|---|---|
| 1 | 1.5111 | 60.41 | $R_1 = -113.370$ | $T_1 = 5.0$ | $S_1 = 1.00$ |
|   |        |       | $R_2 = -170.500$ |             |               |
| 2 | 1.5168 | 64.17 | $R_3 = 90.018$   | $T_2 = 14.0$ | $S_2 = 92.56$ |
|   |        |       | $R_4 = 3264.700$ |             |               |
| 3 | 1.6200 | 36.37 | $R_5 = 248.900$  | $T_3 = 12.0$ | $S_3 = 10.00$ |
|   |        |       | $R_6 = -274.580$ |             |               |
| 4 | 1.5168 | 64.17 | $R_7 = -96.024$  | $T_4 = 5.0$  |               |
|   |        |       | $R_8 = 900.000$  |             |               |

For the lens assembly described by the parameters of Table 1, the lens 1 has an equivalent focal length of $-673.96$ mm and a nominal diameter of 100.0 mm; lens 2 has an equivalent focal length of 178.85 mm and a nominal diameter of 90.0 mm; lens 3 has a equivalent focal length of 212.44 mm nominal diameter of 100.0 mm; and lens 4 has an equivalent focal length of $-167.61$ mm and a nominal diameter of 110.0 mm. In this embodiment the lens elements are designed and sized to project a full-size A4 stage over its entire magnification range. The lens system shown in Table 1 has an equivalent focal length of 244.96 mm and a total length of 139.56 mm. The telephoto ratio of the lens being assembly of Table 1 is 1.71, the telephoto ratio being defined as the lens assembly length plus the back focus distance of the lens assembly, divided by the focal length of the lens assembly.

Table 2 shows the corresponding back focal distances in millimeters and projection distances in meters for given magnifications, when the lens assembly of Table 1 is employed.

TABLE 2

| Magnification | Back Focal Distance (mm) | Projection Distance (m) |
|---|---|---|
| 9.5X | 305.3 | 2.440 |
| 6.0X | 320.3 | 1.580 |
| 2.5X | 377.5 | 0.725 |

A second embodiment of the lens assembly of the present invention is indicated in Table 3 wherein the definitions of the quantities involved and the numbering convention of the lenses are the same as described with respect to Table 1.

TABLE 3

| Lens | Refractive Index $N_d$ | Abbe Number V | Radius of Curvature R (mm) | Thickness T (mm) | Airspaces S (mm) |
|---|---|---|---|---|---|
| 1 | 1.5111 | 60.41 | $R_1 = -102.870$ | $T_1 = 3.0$ | $S_1 = 1.00$ |
|   |        |       | $R_2 = -152.350$ |              |               |
| 2 | 1.5168 | 64.17 | $R_3 = 89.286$   | $T_2 = 14.0$ | $S_2 = 93.00$ |
|   |        |       | $R_4 = -2221.310$ |              |               |
| 3 | 1.6259 | 35.70 | $R_5 = 211.680$  | $T_3 = 14.0$ | $S_3 = 10.00$ |
|   |        |       | $R_6 = -503.850$ |              |               |
| 4 | 1.5168 | 64.17 | $R_7 = -96.154$  | $T_4 = 3.0$  |               |
|   |        |       | $R_8 = 1292.470$ |              |               |

The lens assembly defined by the values of Table 3 has an equivalent focal length of 234.68 mm, a total length of 138.0 mm, and a telephoto ratio of 1.78.

Equivalent focal lengths of the individual lens elements are as follows: lens 1: −632.69 mm, lens 2: 166.43 mm, lens 3: 239.96 mm, lens 4: −173.05 mm. Nominal lens diameters are the same as in the embodiment.

Table 4 illustrates the back focal distances and projection distances for corresponding magnifications, when the assembly of Table 3 is utilized.

TABLE 4

| Magnification | Back Focal Distance (mm) | Projection Distance (m) |
|---|---|---|
| 9.5X | 304.6 | 2.330 |
| 6.0X | 319.0 | 1.510 |
| 2.5X | 373.8 | 0.686 |

It is to be understood that numerous and various modifications can be readily devised in accordance with the principles of the present invention by those skilled in the art without departing from the spirit and scope of the invention. Therefore, it is not desired to restrict the invention to the particular constructions illustrated and described but to cover all modifications that may fall within the scope of the appended claims.

What is claimed is:

1. A lens assembly for use in an overhead projector for projecting an image from a transparency stage to a projection screen, said overhead projector including a light source, said lens assembly comprising, in order from said stage to said screen, a diverging meniscus lens, airspaced from a converging meniscus lens, airspaced from a converging double convex lens, airspaced from a diverging double concave lens.

2. A lens assembly for use in an overhead projector according to claim 1, further including a mirror positioned between said converging meniscus lens and said converging double convex lens for directing light from said light source through said lens assembly.

3. The lens assembly for use in an overhead projector according to claim 1, wherein said lens assembly has a telephoto ratio, defined as the length of said lens assembly plus the back focal distance of said lens assembly divided by the focal length of said lens assembly, of approximately 1.75.

4. The lens assembly for use in an overhead projector according to claim 1, wherein the characteristics of said lenses and their spatial relationship are substantially the same as in the following table:

| Lens | $N_d$ | V | R | T, S |
|---|---|---|---|---|
| 1 | 1.5111 | 60.41 | $R_1 = -113.370$ | $T_1 = 5.0$ |
|   |        |       | $R_2 = -170.500$ |               |
|   |        |       |                  | $S_1 = 1.00$  |
| 2 | 1.5168 | 64.17 | $R_3 = 90.018$   | $T_2 = 14.0$ |
|   |        |       | $R_4 = 3264.700$ |               |
|   |        |       |                  | $S_2 = 92.56$ |
| 3 | 1.6200 | 36.37 | $R_5 = 248.900$  | $T_3 = 12.0$ |
|   |        |       | $R_6 = -274.580$ |               |
|   |        |       |                  | $S_3 = 10.00$ |
| 4 | 1.5168 | 64.17 | $R_7 = -96.024$  | $T_4 = 5.0$  |
|   |        |       | $R_8 = 900.000$  |               | wherein the respective lenses are numbered from said stage toward said screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lenses and being respectively identified by the subscript numeral used with each R, plus and minus values of R indicating surfaces which are respectively convex and concave to radiation entering the lens from the stage, the axial thicknesses T of the respective lens elements and the airspaces S between lenses are given to the fifth column, the respective thicknesses T of the lenses and the airspace S between lenses being identified by subscripts numbered in sequence in the same order as the lenses, and the quantities R, T, and S being expressed in millimeters.

5. The lens assembly for use in an overhead projector according to claim 1, wherein the characteristics of said lenses and their spatial relationship are substantially the same as in the following table:

| Lens | $N_d$ | V | R | T, S |
|---|---|---|---|---|
| 1 | 1.5111 | 60.41 | $R_1 = -102.870$ | $T_1 = 3.0$ |
|   |        |       | $R_2 = -152.350$ |               |
|   |        |       |                  | $S_1 = 1.00$  |
| 2 | 1.5168 | 64.17 | $R_3 = 89.286$   | $T_2 = 14.0$ |
|   |        |       | $R_4 = -2221.310$ |               |
|   |        |       |                  | $S_2 = 93.00$ |
| 3 | 1.6259 | 35.70 | $R_5 = 211.680$  | $T_3 = 14.0$ |
|   |        |       | $R_6 = -503.850$ |               |
|   |        |       |                  | $S_3 = 10.00$ |
| 4 | 1.5168 | 64.17 | $R_7 = -96.154$  | $T_4 = 3.0$  |
|   |        |       | $R_8 = 1292.470$ |               | wherein the respective lenses are numbered from the stage toward the screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lenses and being respectively identified by the subscript numeral used with each R, plus and minus values of R indicating surfaces which are respectively convex and concave to radiation entering the lens from the stage, the axial thicknesses T of the respective lens elements and the airspaces S between lenses are given to the fifth column, the respective thicknesses T of the lenses and the airspace S between lenses being identified by subscripts number din sequence in the same order as the lenses, and the quantities R, T, and S being expressed in millimeters.

* * * * *

UNITED STATES PATENT AND TRADEMARK OFFICE
CERTIFICATE OF CORRECTION

PATENT NO. : 4,867,555

DATED : September 19, 1989

INVENTOR(S) : Dennis F. Vanderwerf

It is certified that error appears in the above-identified patent and that said Letters Patent is hereby corrected as shown below:

Column 2, line 1 after "type" insert --of--

Column 3, line 16 after "Referring" insert --to Fig.--

Column 4, line 43 after "mm" insert --and a--

Column 5, line 25 after "the" (2nd) insert --first--

Signed and Sealed this

Twenty-seventh Day of August, 1991

Attest:

HARRY F. MANBECK, JR.

Attesting Officer

Commissioner of Patents and Trademarks